Patented Mar. 15, 1932

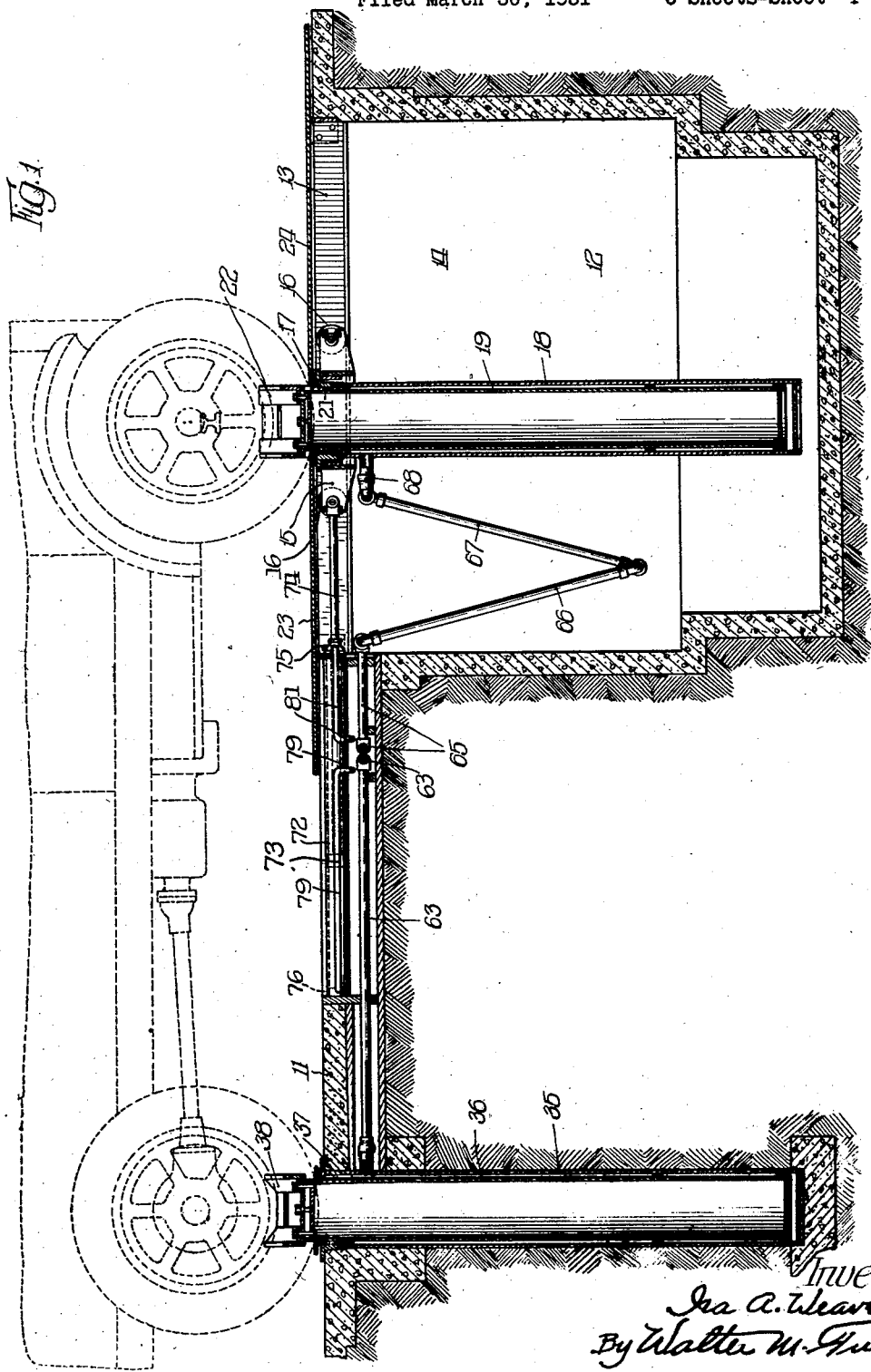

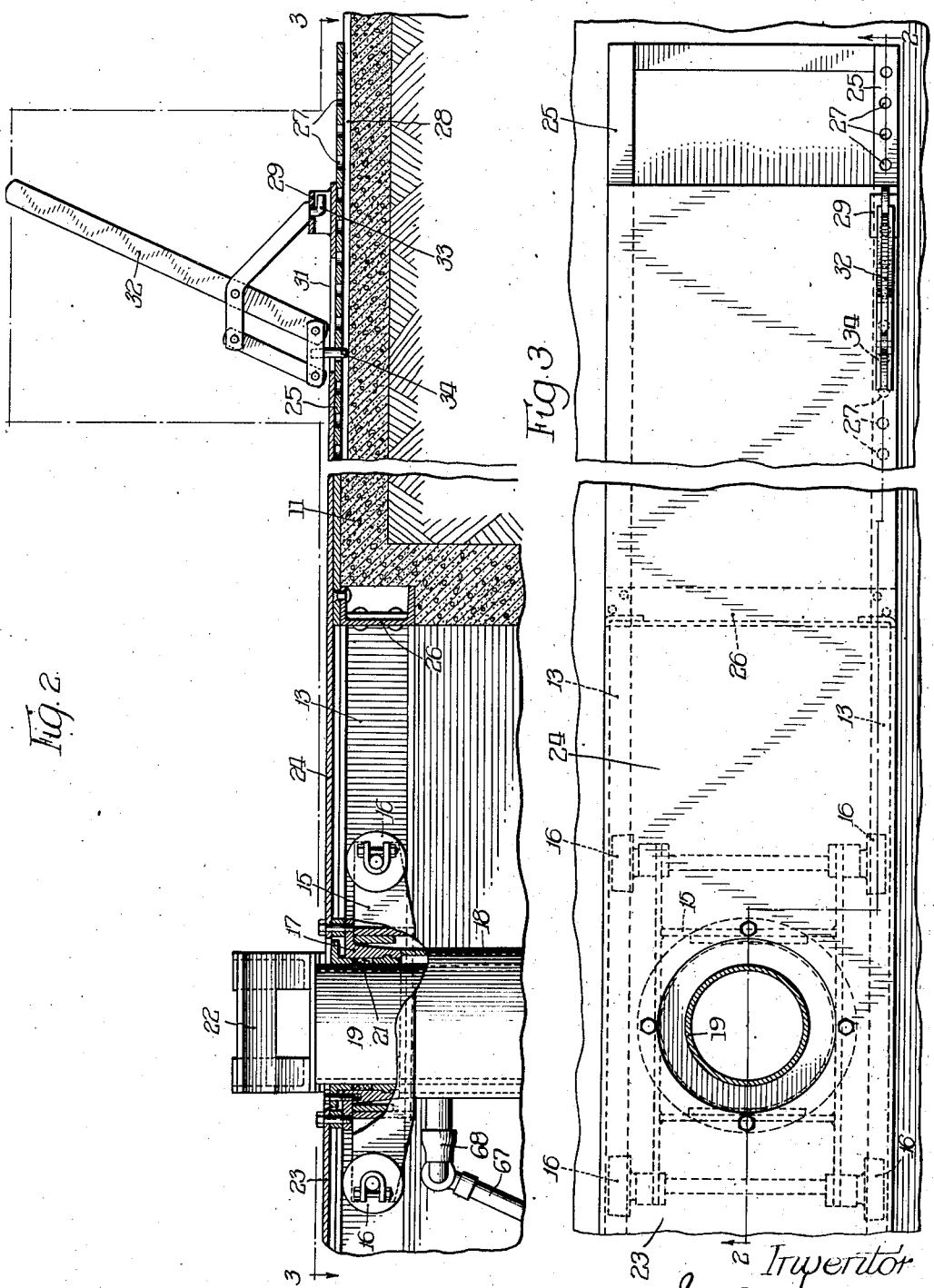

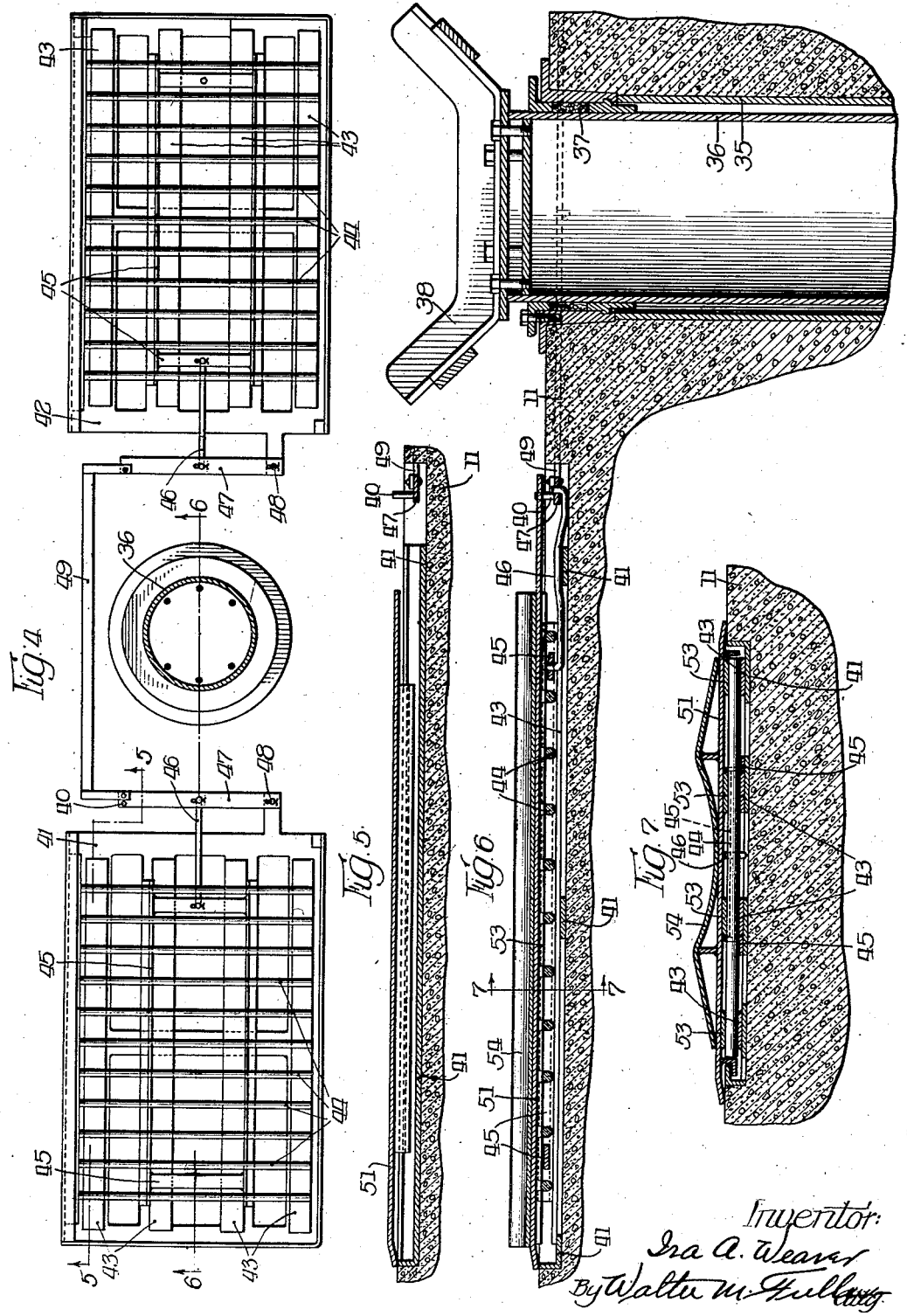

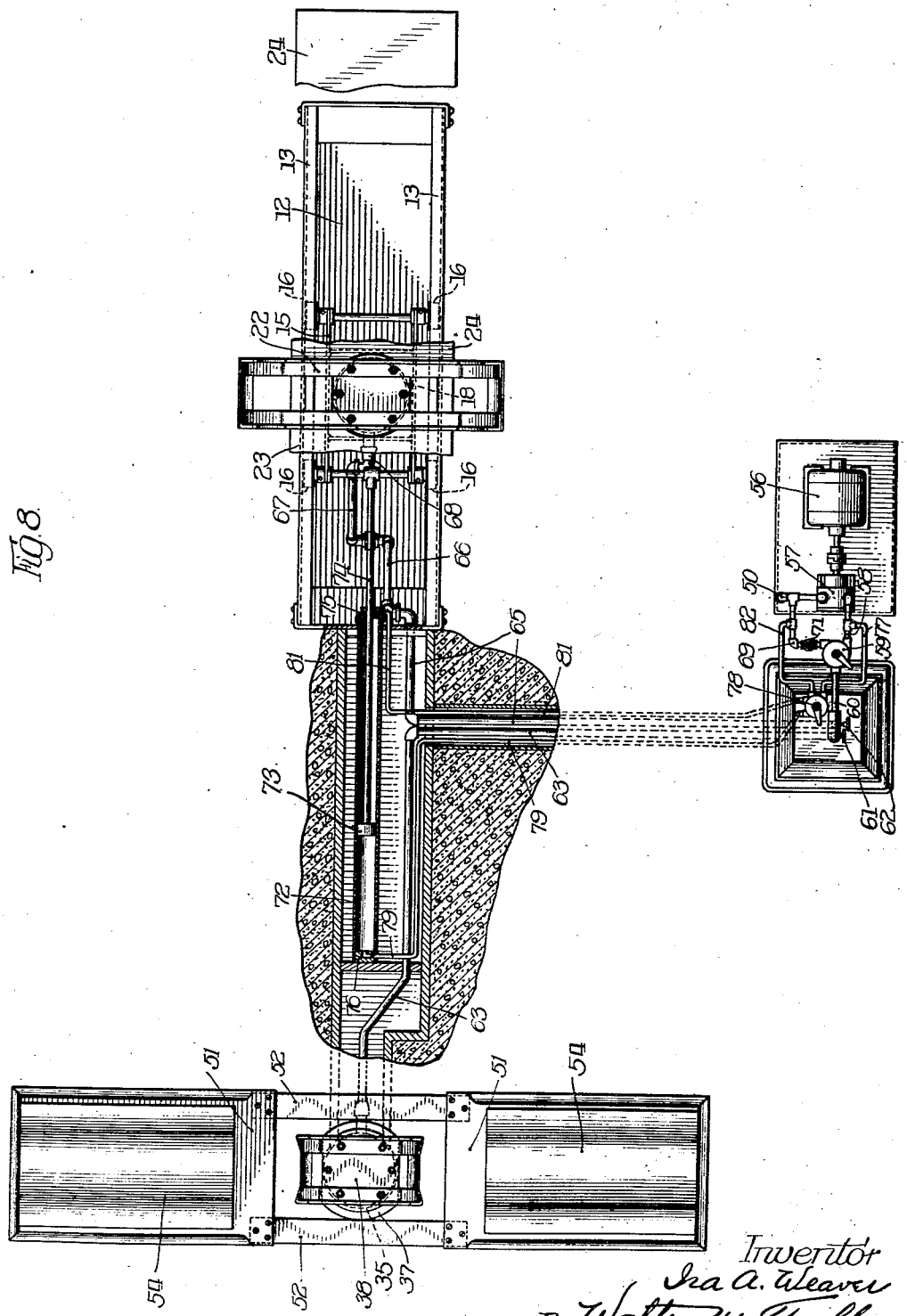

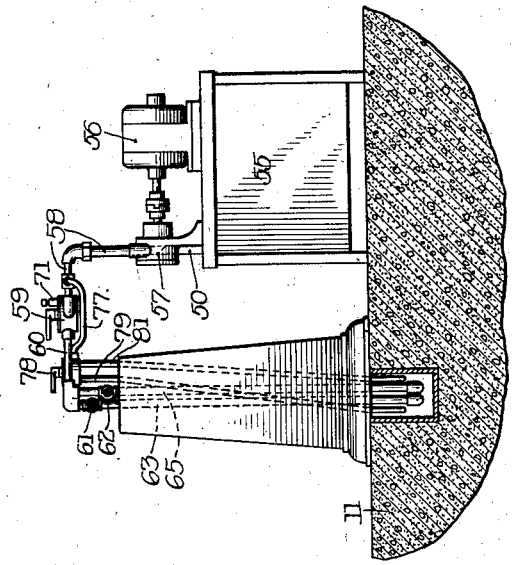

1,849,777

UNITED STATES PATENT OFFICE

IRA A. WEAVER, OF SPRINGFIELD, ILLINOIS, ASSIGNOR TO WEAVER MANUFACTURING COMPANY, OF SPRINGFIELD, ILLINOIS, A CORPORATION OF ILLINOIS

VEHICLE LIFT

Application filed March 30, 1931. Serial No. 526,386.

My invention relates to elevators or lifts for automobiles or the like, such as trucks, buses, etc., whereby they may be raised from the ground or floor to permit easy access to their lower parts for servicing, repairs, adjustments, etc.

One object of the invention is to provide a lift of this character with novel and improved means for adjusting or regulating the appliance to adapt it for use with vehicles of different wheel-base lengths.

A further aim of the invention is to supply an apparatus of this type which incorporates means to facilitate the centering of the rear-axle or differential-housing of the vehicle over the lifting saddle which is to engage and elevate it.

Another purpose of the invention is to furnish a vehicle-lift of great capacity and power suitable for use with the heaviest types of trucks and buses.

Still an added, salient feature of the improved novel structure is its simplicity of construction which renders it capable of giving satisfactory and reliable service under all conditions, and which allows it to be constructed in a relatively economical manner and to be sold at a reasonable price.

Another goal of the invention is the provision of a vehicle lift or hoist which is unlikely to become damaged or injured in ordinary service and which may be worked with comparative ease and dispatch.

To allow those skilled in this art to become fully acquainted with the invention, both as to structure and mode of operation, a present, preferred embodiment of the invention has been illustrated in the accompanying drawings forming a part of this specification, and to which reference should be had in connection with the following detailed description, and, for simplicity, the same reference numerals have been employed to designate like parts throughout the several figures.

In these drawings,—

Fig. 1 is a central, vertical, longitudinal section through the appliance as it is installed in the ground, showing in dotted lines a vehicle about to be lifted;

Fig. 2 is a detailed, fragmentary section on an enlarged scale, on line 2—2 of Fig. 3, of the means for adjusting the position of the lifting-plunger and its associated cylinder to locate them properly below the front-axle of the vehicle;

Fig. 3 is a horizontal section on line 3—3 of Fig. 2;

Fig. 4 is a plan view of the vehicle-centering means associated with the rear lifting-plunger and its cylinder, the saddle, and cover or guide plates, with which the automobile rear wheels co-operate, being omitted, thus disclosing the anti-friction roller constructions employed for such plates or platforms;

Fig. 5 is an enlarged, vertical section on line 5—5 of Fig. 4, with the cover-plate in position;

Fig. 6 is a vertical section, on an enlarged scale, on line 6—6 of Fig. 4, with the cover plate or platform in position;

Fig. 7 is a cross-section on line 7—7 of Fig. 6.

Fig. 8 illustrates more particularly the means for supplying and controlling the liquid under pressure used for operating the two lifting plungers, and it shows a modified style of power-actuated means for adjusting the front-axle cylinder and plunger;

Fig. 9 is an elevation of a part of a liquid pumping and governing or regulating mechanism; and Fig. 10 is a fragmentary, vertical section of the means for lifting the front-axle of the vehicle.

Referring first to Fig. 1, it will be observed that the major portion of the improved and novel vehicle-lift, when not in operation, is located below the ground level or garage floor level 11.

A suitable pit 12 of appropriate length, depth and width, with its walls suitably cemented or otherwise lined, has a pair of horizontal channel-bars 13, 13 mounted in the top portions of its side walls 14, with their upper flanges substantially on the ground or floor level (see Figs. 1, 2 and 10).

A small truck or carriage 15 of suitable construction, having carrying-wheels 16, 16 rolling on the lower, inwardly-projecting flanges of the channel-bars, which constitute tracks for the wheels, has a central opening accommodating the top, flanged ring 17 of a relatively long, vertical cylinder 18 closed at its lower end, the flange of such ring resting on the carriage and thus supporting the cylinder thereon.

Inside of, and adapted to slide in, such cylinder is a hollow plunger 19 closed at its bottom, an appropriate packing, sealing or stuffing-box construction 21 being interposed between the plunger and the cylinder-ring 17 to form a fluid-tight connection between them.

At its top, such vertically slidable plunger is fitted with a lifting saddle or seat member 22 constructed and shaped to engage the front axle or other appropriate part of the forward portion of the vehicle, whereby to lift or elevate it, and to adapt the appliance for use with vehicles of substantially different wheel-base lengths, means are provided for causing the carriage or truck 15 to travel along on the channel-bar trackways, the cylinder and its associated lifting-plunger moving correspondingly at the same time because they are directly mounted on the carriage.

Such adjustment of the positions of the parts may be effected either by manual or power means, both of which have been illustrated, but the former will be described first.

It is, of course, desirable to maintain the pit covered or closed for all adjustments of the carriage and its plunger, and, to that end, the carriage has two cover-plates 23 and 24 secured to, and consequently moving with, it.

A flat frame 25 (Figs. 2 and 3), secured to the channels 13, 13, or to a cross-bar 26 fastening their ends together, rests on the floor or ground, or is slightly embedded in its top surface, one bar of such frame having a series of spaced holes 27 therethrough, a shallow cavity 28 being present below such bar.

The corresponding, flat cover-plate 24, at one corner, is equipped with an elevated, apertured bracket 29 and with a slot 31 through the plate adjacent thereto.

When it is desired to modify the position or location of such front-axle cylinder and plunger, a lever-tool 32, of the type shown in Fig. 2, is used, its hook 33 being inserted through the aperture of the bracket, and its other pin 34 being introduced into one of the stationary holes 27.

Obviously, by rocking or swinging the tool-handle one way or the other, the correlated cover-plate and its truck, cylinder and plunger will be correspondingly shifted.

If still further adjustment is required, the pin or lug 34 may be inserted in a new hole and the operation repeated.

Turning now to the mechanism for lifting the rear axle of the vehicle, it will be noted that this comprises an upright, stationary cylinder 35 sunk in the ground, in alignment with the line of travel of the front-axle carriage and its associated cylinder and plunger, and a plunger 36 reciprocating in such cylinder 35, a suitable packing or sealing means 37 being employed between the two.

The top end of such plunger carries a lifting saddle 38 designed and adapted to engage and elevate the back or rear-end portion of the vehicle by engagement with its rear-axle or differential-housing.

It is somewhat difficult to drive a vehicle, especially one of great length, over such rear lifting-saddle so that the rear axle of the automobile will be correctly centered over the laterally immovable plunger and saddle.

To facilitate and aid the required registration of such parts and also to prevent the vehicle from traveling too far forwardly, or not a sufficient distance, to align the axle and saddle, means have been provided to assist in stopping the forward movement of the vehicle at the proper point and to allow the easy sidewise shifting of the rear part of the vehicle.

Accordingly, on opposite sides of the rear cylinder and plunger, are a pair of horizontal frames 41, 42 resting on the surface of the ground or floor, or slightly sunk therein, each such frame having a plurality of flat, parallel track-bars 43, 43 disposed longitudinally crosswise the direction connecting the two plungers, and on which roll a number of anti-friction rollers 44, 44, each of the two groups or sets of rollers being mounted in a cage 45 of appropriate construction connected at one end by a link 46 to a lever 47 fulcrumed on the frame at 48, the free ends of the two levers being joined together by a link 49, whereby equal degrees of movement are assured for the two sets of levers.

One of the levers has an upstanding pin 40 at a distance from the fulcrum of such lever twice that of the connection of the lever with the roller-cage, and this pin cooperates with a hole in the corresponding cover-plate, so that the two sets of rollers will be compelled to travel a distance one-half that of the movement of the plates.

Two cover plates or platforms 51, 51, connected together by bars 52, 52, overlie such frames and rollers, having track-bars 53, 53 on their under faces bearing and traveling on the rollers.

Each cover-plate has a saddle or seat member 54 on its top, the troughs or depressions of such members being in alignment crosswise the structure and in register with the rear-axle lifting-saddle 38.

Referring now to the means for controlling the liquid for actuating the pair of plungers, it will be noted that, on a suitable oil-tank 55, an electric motor 56 is mounted, and is employed to drive an oil-pump 57 which draws its supply of oil from the supply-tank 55 through an intake pipe 50.

The pump delivers the oil through a pipe 58 to a two-way valve 59, and from the latter, by means of pipe 60, to two hand valves 61 and 62, and from valve 61, through its pipe 63, to the interior of the rear-axle cylinder 35, and from valve 62, through a pipe 65 and connected swiveled pipes 66 and 67, or their equivalent in the form of a flexible hose, and connection 68, to the interior of the front-axle, adjustable cylinder 18.

Thus, if the pump is in operation, and if the three valves 59, 61 and 62 are open, the pumped oil will be forced through the specified conduits into the two cylinders, regardless of the adjustment of the front-axle cylinder, and will cause the ascent of their plungers, with the corresponding elevation of the vehicle above them.

Valve 59 is also connected to a by-pass 69 joined to the pump-inlet pipe 50, such by-pass incorporating also a safety valve 71, whereby, when valve 59 closes the connection between pipes 58 and 60 and establishes communication of pipe 58 with the by-pass, the pump may continue to operate without harm.

Instead of effecting the adjustment of the front-cylinder plunger and carriage by the manual means already described, an oil-operated appliance may be used, and this may comprise a horizontal cylinder 72 housing a piston 73 connected by a piston-rod 74 to the truck or carriage 15 in any approved manner, such rod, of course, extending through a cap 75 for one end of the cylinder, the opposite extremity of the latter being fitted with a suitable closure 76.

Pipe 58 is connected by a pipe 77 to a double, two-way valve 78, which is joined to the interior of the two ends of cylinder 72 through passages in its end closures by two pipes 79 and 81, and valve 78 is also connected to the by-pass 69 by another pipe 82.

By this means, oil may be pumped into either end of the cylinder 72 and permitted to discharge from its other end, to slide the piston, whereby to bring about the desired position of the carriage and its cylinder and plunger.

The apparatus is operated as follows:

The automobile, truck, bus or the like, is driven over the appliance until its rear wheels settle into the positioning or guiding seats or sockets 54, 54.

This assures that the rear axle is in position lengthwise, but not necessarily crosswise, the apparatus for proper register with the rear-axle lifting-saddle 38.

Then the rear end of the vehicle is pushed sidewise, the seats 54 and their companion platforms 51 traveling on their anti-friction rollers 44 until the rear axle or its differential-housing is in substantially precise register with the saddle 38.

Thereupon, by means of the tool 32 or by manipulation of valve 78, as the case may be, the carriage 15 is adjusted to bring the forward plunger in correct position beneath the front-axle.

Then valves 61 and 62 are opened more or less to cause the simultaneous and equal ascent of the two plungers and their lifting-saddle to raise the vehicle the required amount and to maintain its horizontality throughout.

Valves 61 and 62 are then closed to terminate the lifting operation and to prevent the heavier end of the vehicle from settling and forcing some of the oil in the cylinder under it into the other cylinder, and thus bringing about an inclination of the elevated vehicle.

The work on the automobile having been completed, valve 59 is connected, through the by-pass 69 and pipe 50, with the oil-supply pipe, and then valves 61 and 62 may be opened the required amount to secure the desired rate of descent of the vehicle and the plungers and to preserve the horizontal position of the vehicle throughout the lowering action, the weight of the vehicle by expulsion of the oil from the cylinders back into the supply-tank bringing about the descent of the parts involved, as will be readily understood.

Those acquainted with this art will understand that this invention, as defined by the following claims, is not limited to the exact and precise details of structure, and that this embodiment of the invention may be modified within comparatively wide limits without departure from the heart and principles of the invention and without the sacrifice or loss of any of its material advantages.

I claim:

1. In a vehicle-lift, the combination of lifting means adapted to engage and elevate the rear portion of the vehicle, independent lifting means designed to engage and elevate the front portion of the vehicle, means to adjust one of said lifting means toward and from the other lifting means to adapt the appliance to vehicles of different wheel-base lengths, and means to raise and to lower said independent lifting means substantially simultaneously.

2. In a vehicle-lift, the combination of lifting means adapted to engage and elevate the rear axle of the vehicle, independent lifting means designed to engage and elevate the front axle of the vehicle, means to adjust said front-axle lifting means toward and from said rear-axle lifting means to adapt the appliance to vehicles of different wheel-base lengths, and means to raise and to lower said independent lifting means substantially simultaneously.

3. In a vehicle-lift, the combination of a stationary upright cylinder, a plunger slidable in said cylinder, means on said plunger adapted to engage and elevate one end portion of the vehicle to be lifted, a second upright cylinder, means to adjust said second cylinder toward and from said first cylinder to adapt the appliance to vehicles of different wheel-base lengths, a plunger slidable in said second cylinder, means on said second plunger adapted to engage and elevate the other end portion of the vehicle, and means to admit fluid under pressure into said cylinders substantially simultaneously to raise the vehicle and to permit substantially simultaneous discharge of the fluid from said cylinders to effect the lowering of the vehicle.

4. In a vehicle-lift, the combination of means to engage and to lift and to lower an axle of the vehicle, means to operate said lifting and lowering means, supporting means, and platforms at opposite sides of said lifting and lowering means on to which the corresponding wheels of the vehicle are adapted to roll and movable on said supporting means crosswise the length of such vehicle, whereby the axle may be centered over said lifting and lowering means by pushing the vehicle and the platforms bodily crosswise the length of the vehicle.

5. In a vehicle-lift, the combination of means to engage and to lift and to lower an axle of the vehicle, means to operate said lifting and lowering means, supporting means, and platforms at opposite sides of said lifting and lowering means on to which the corresponding wheels of the vehicle are adapted to roll and movable on said supporting means crosswise the length of such vehicle, whereby the axle may be centered over said lifting and lowering means by pushing the vehicle and the platforms bodily crosswise the length of the vehicle, one at least of said platforms having a depression on its top to receive the corresponding wheel of the vehicle and to register the axle thereof with said lifting and lowering means lengthwise the vehicle.

6. In a vehicle-lift, the combination of means to engage and to lift and to lower an axle of the vehicle, means to operate said lifting and lowering means, supporting means, platforms at opposite sides of said lifting and lowering means on to which the corresponding wheels of the vehicle are adapted to roll, said platforms being movable on said supporting means crosswise the length of the vehicle, and anti-friction means supporting said platforms on said supporting means, whereby the axle may be centered over said lifting and lowering means by pushing the vehicle and the platforms bodily crosswise the length of the vehicle.

7. In a vehicle-lift, the combination of a stationary upright cylinder, a plunger slidable in said cylinder, means on said plunger adapted to engage and elevate the rear axle of the vehicle to be lifted, a second upright cylinder, means to adjust said second cylinder toward and from said first cylinder to adapt the appliance to vehicles of different wheel-base lengths, a plunger slidable in said second cylinder, means on said second plunger adapted to engage and elevate the front axle of the vehicle to be lifted, means to admit fluid under pressure into said cylinders substantially simultaneously to raise the vehicle and to permit substantially simultaneous discharge of the fluid from said cylinders to effect the lowering of the vehicle, supporting means, platforms at opposite sides of said stationary cylinder on to which the corresponding wheels of the vehicle are adapted to roll, said platforms being movable crosswise the length of such vehicle and anti-friction means supporting said platforms on said supporting means, whereby the vehicle rear axle may be centered over said stationary-cylinder plunger by pushing the vehicle and the platforms bodily crosswise the length of the vehicle.

8. In a vehicle-lift, the combination of a stationary upright cylinder, a plunger slidable in said cylinder, means on said plunger adapted to engage and elevate the rear axle of the vehicle to be lifted, a second upright cylinder, means to adjust said second cylinder toward and from said first cylinder to adapt the appliance to vehicles of different wheel-base lengths, a plunger slidable in said second cylinder, means on said second plunger adapted to engage and elevate the front axle of the vehicle to be lifted means to admit fluid under pressure into said cylinder substantially simultaneously to raise the vehicle and to permit substantially simultaneous discharge of the fluid from said cylinders to effect the lowering of the vehicle, supporting means platforms at opposite sides of said stationary cylinder on to which the corresponding wheels of the vehicle are adapted to roll, said platforms being movable on said supporting means crosswise the length of said vehicle, and anti-friction means supporting said platforms on said supporting means, whereby the vehicle rear axle may be centered over said stationary-cylinder plunger by pushing the vehicle and the platforms bodily crosswise the length of the vehicle, one at least of said platforms having a depression in its top to receive the corresponding wheel of the vehicle and to register the rear axle thereof with said stationary-cylinder plunger in a direction lengthwise the vehicle.

9. In a vehicle-lift, the combination of lifting means adapted to engage and to elevate and to lower the rear portion of the vehicle, independent lifting means designed to engage and to elevate and to lower the front portion of the vehicle, means to adjust one of said lifting means toward and from the other lifting means to adapt the appliance to vehicles of different wheel-base lengths and means to control the raising and lowering of said lifting means independently of one another.

10. In a vehicle-lift, the combination of a stationary upright cylinder, a plunger slidable in said cylinder, means on said plunger adapted to engage and to elevate and to lower one end portion of the vehicle, a second upright cylinder, means to adjust said second cylinder toward and from said first cylinder to adapt the appliance to vehicles of different wheel-base lengths, a plunger slidable in said second cylinder, means on said second plunger adapted to engage and to elevate and to lower the other end portion of the vehicle, and means to admit and to control the admission of fluid under pressure into said cylinders independently of one another and to permit and control the discharge of the fluid from said cylinders independently of one another.

In witness whereof I have hereunto set my hand.

IRA A. WEAVER.